United States Patent [19]

Grimes

[11] Patent Number: 5,488,425
[45] Date of Patent: Jan. 30, 1996

[54] APPARATUS FOR STORING VIDEO INFORMATION BY RECOGNIZING VIDEO FRAMES

[75] Inventor: Gary J. Grimes, Thornton, Colo.

[73] Assignee: AT&T Corp., Murray Hill, N.J.

[21] Appl. No.: 171,952

[22] Filed: Dec. 22, 1993

[51] Int. Cl.⁶ .................................................. H04N 5/44
[52] U.S. Cl. ...................... 348/559; 348/714; 348/553; 358/335
[58] Field of Search .............................. 348/1, 2, 4, 5, 348/559, 553, 714, 715; 358/335; 455/2

[56] References Cited

U.S. PATENT DOCUMENTS

| 4,450,531 | 5/1984 | Kenyon et al. ............................ 348/1 |
| 4,739,398 | 4/1988 | Thomas et al. .......................... 358/84 |
| 4,843,562 | 6/1989 | Kenyon et al. ............................ 348/1 |
| 5,029,220 | 7/1991 | Juday ....................................... 382/6 |
| 5,031,224 | 7/1991 | Mengel et al. ........................... 382/10 |
| 5,058,180 | 10/1991 | Khan ........................................ 382/14 |
| 5,153,722 | 10/1992 | Goedeke et al. ......................... 358/108 |

FOREIGN PATENT DOCUMENTS

| 0080782 | 4/1991 | Japan . |
| 0328970 | 11/1992 | Japan . |
| 5056386 | 3/1993 | Japan . |

OTHER PUBLICATIONS

Little et al., "A Digital On–Demand Video Service Supporting Content —Based Queries", Proceedings of the ACM, Multimedia '93, Anaheim Calif., pp. 427–435 Aug. 1993.

*Primary Examiner*—David E. Harvey
*Attorney, Agent, or Firm*—John C. Moran

[57] ABSTRACT

Allowing the ability to specify a general frame format and to automatically recognize similar frames at later points in time. A user initially selects the type of frame by watching a particular program such as the weather portion of a newscast and selects the desired frame using a hand-held control unit similar to the present hand-held control units for VCRs or television sets. When the frame appears on the television set, the user presses a button on the hand-held control unit, and the apparatus stores the frame that is presently being displayed. The apparatus then analyzes the stored frame to determine a set of recognition parameters. Those parameters are used to recognize similar frames in subsequent broadcast segments and to store one of those recognized frames for each broadcast segment. The user also specifies a time period during which the system will search for the specified frame. Further, the audio portion of a program segment is stored as long as frames are being recognized in that segment.

21 Claims, 7 Drawing Sheets

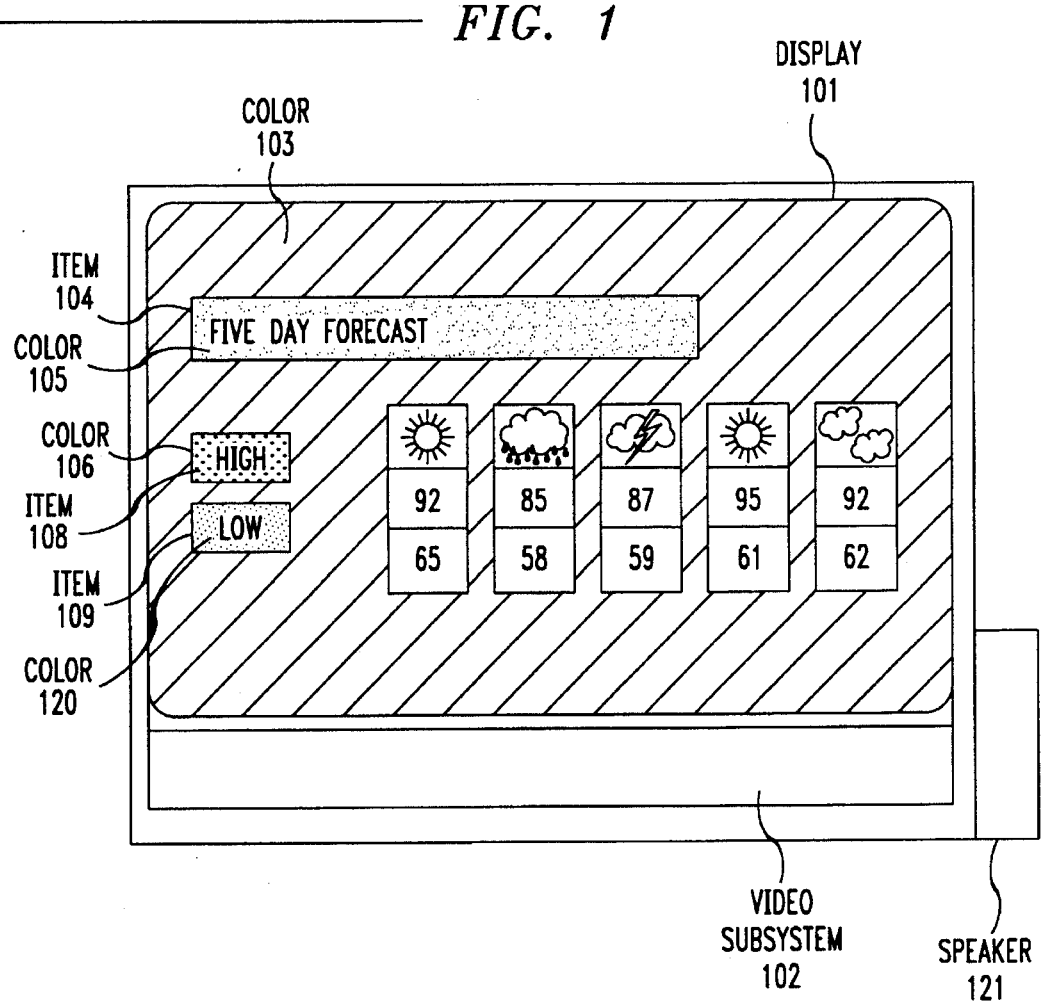
FIG. 1
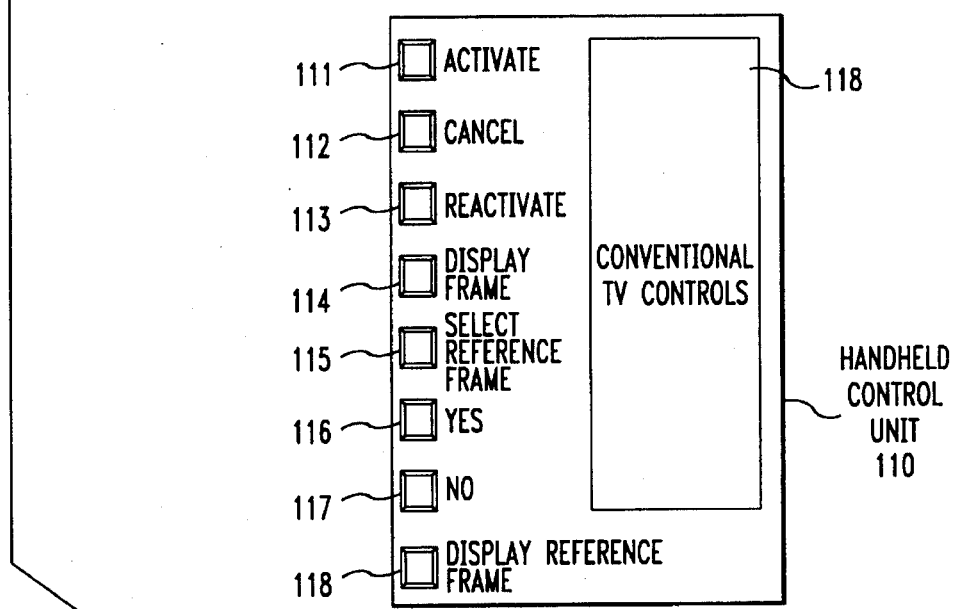

5,488,425

APPARATUS FOR STORING VIDEO INFORMATION BY RECOGNIZING VIDEO FRAMES

TECHNICAL FIELD

This invention relates to video communication, and, in particular, to recognizing specified video frames and storing video and audio information after the recognition of these video frames.

BACKGROUND OF THE INVENTION

In television programming, it is often the case where an individual is only interested in a single frame of video information or a very short time interval of video information. This is particularly true during news programs where an individual may only be interested in the display of the weather map or the five day weather forecast chart. Another situation where a short amount of video information is desired is the few frames of video information which show the results of the various market indicators for the stock market. Whereas, it is possible to use a video cassette recorder (VCR) to record the entire news program or any time interval of the news program, the weather information or stock information often appears at different times during the news program. An individual is still required to search through a significant portion of a news program stored on the VCR to find the piece of relevant information. Another situation arises where an individual wants to watch a program on one television station but be able to obtain the weather forecast or stock market prices being broadcast on yet another television station. Yet another situation arises where an individual wants to extract a frame of video information and the accompanying audio information from a prerecorded medium.

U.S. Pat. No. 4,739,398 discloses a system designed to recognize and record the number of broadcast segments in the programming received from a television station. The object of the system disclosed in U.S. Patent 4,739,398 is to maintain an accurate count of advertisements appearing on television throughout the country. The disclosed system does not lend itself to being used by a consumer to capture particular video patterns nor does the system disclose the ability for replaying the advertisements.

SUMMARY OF THE INVENTION

The foregoing problems are solved, and a technical advance is achieved by an apparatus and method that allow the ability to specify a general frame format and to automatically recognize similar frames at later points in time. A user initially selects the type of frame by watching a particular program such as the weather portion of a newscast and selects the desired frame using a hand-held control unit similar to the present hand-held control units for VCRs or television sets. When the frame appears on the television set, the user presses a button on the hand-held control unit, and the apparatus stores the frame that is presently being displayed. The apparatus then analyzes the stored frame to determine a set of recognition parameters. These parameters are used to recognize the similar frames in subsequent broadcast segments and to store one of recognized frames for each broadcast segment. The user specifies a particular time period during which the system searches for the specified frames. Further, the audio portion of a program segment is stored as long as frames are being recognized in that segment.

BRIEF DESCRIPTION OF THE DRAWING

FIG. 1 illustrates a system in accordance with the invention;

DETAILED DESCRIPTION

Figure 2:
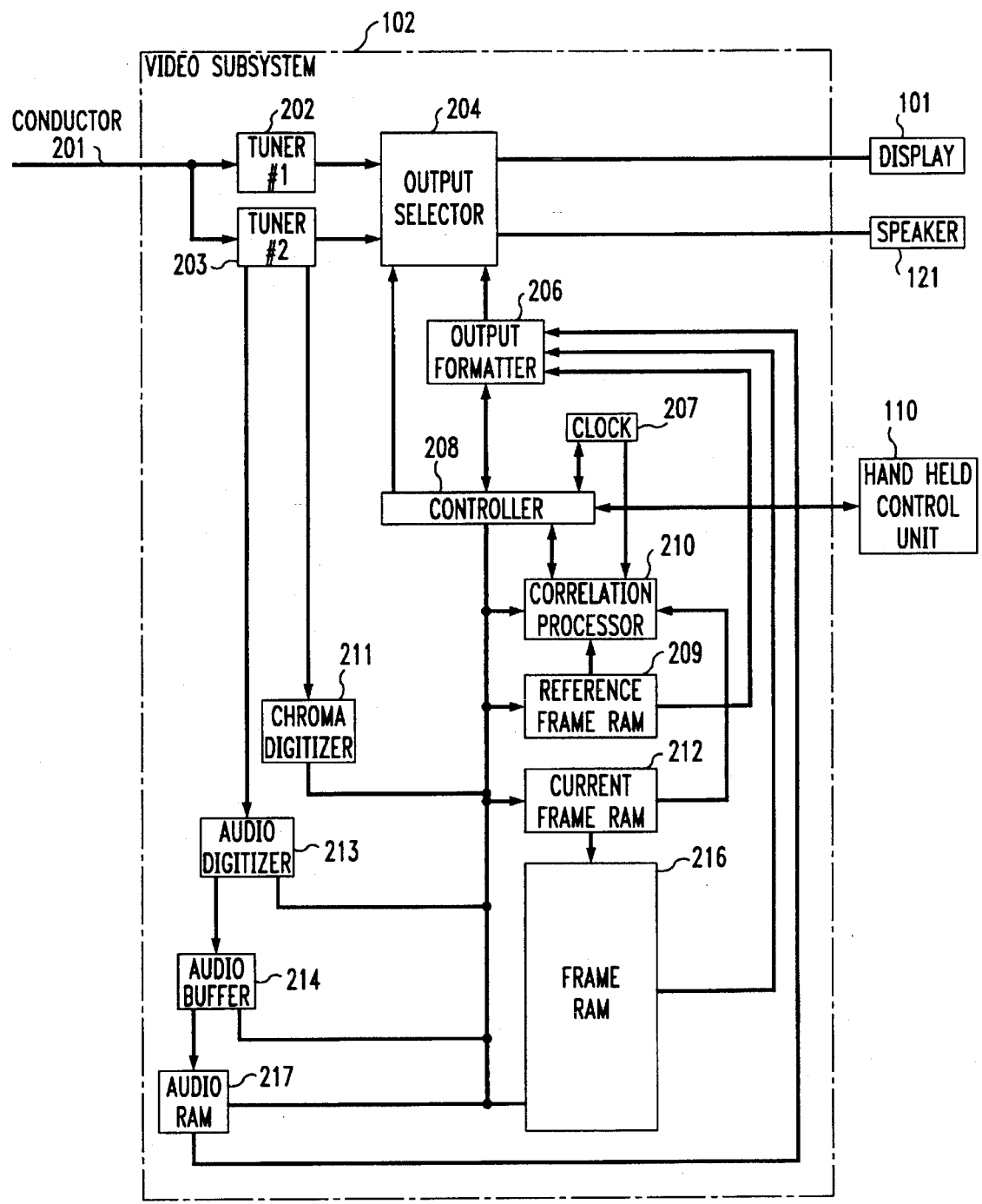
FIG. 2 illustrates a video subsystem in accordance with the invention.

Illustrated on display 101 of FIG. 1 is the type of information that the video system 102 is designed to recognize and store in accordance with the invention. As will be described in greater detail with respect to FIG. 2, video subsystem 102 is capable of displaying the programming of one television channel while searching the programming of a second television channel for a frames similar to the reference frame. Such a reference frame is illustrated in FIG. 1 as being displayed on display 101. A user of video system 102 uses hand-held control unit 110 to activate the frame recognition abilities and to access frames once they have been stored. The frame illustrated in display 101 is an example of a weather forecast that is commonly used in local news programs of various televisions stations. Whereas, the different news programs utilize different types of displays, in general there is a display having a fixed format that is used for long intervals of time in the television programming of a particular news program.

The following describes in general terms how a user would utilize control unit 110 to practice the invention utilizing video subsystem 102 and display 101. To specify to video subsystem 102 the frame that it is to display, the user first actuates activate button 111 on control unit 1 10. The user then utilizes the conventional television control buttons in block 118 of control unit 110 to select the channel to which video subsystem 102 is to be tuned for the capture of frames. This channel is then displayed on display 101. Next, the user utilizes the time control buttons of block 118 to specify the time interval during which video subsystem 102 is to examine the designated channel for the particular pattern.

When the desired pattern appears on display 101, the user actuates select reference frame button 115. Video subsystem 102 then stores the displayed frame of information. To verify that the user has selected the desired frame, video subsystem 102 then displays the selected video frame on display 101 and through the use of text messages on display 101, interrogates the user to assure that the selected frame is the frame that the user wanted. The user answers these questions through the user of buttons 116 and 117. If the user should actuate NO button 117, then the user is given the opportunity to select another frame. If the user actuates YES button 116, the displayed frame is stored as the reference frame, and display 101 returns to displaying the selected channel for normal television viewing.

Once the user has selected the reference frame, video subsystem 102 then processes this reference frame to ascertain correlation information. The latter information will be used in comparisons with frames in the designated television channel within the specified time interval.

When video subsystem 102 determines that a current frame on the designated television channel occurring in the designated time window matches the reference frame, video subsystem 102 stores this frame of information with the time of day (time stamp). Video subsystem 102 also stores the audio portion of the television program for as along as the current frames match the reference frame. In addition, video subsystem 102 displays a textual message on display 101 indicating that a video frame matching the reference frame has been stored. The user can access the stored frame by actuating display frame button 114. In response to the actuation of button 114, video subsystem 102 displays the stored frame and the audio information associated with the stored frame. Video subsystem 102 gives the user the opportunity to view all frames that were found via a match by the user utilizing buttons 116 and 117.

The user can cancel the recognition operation by actuation of cancel button 118. If the user chooses to reactivate the recognition process using the last stored reference frame, the user actuates reactivate button 113. To select a new reference frame, the user must actuate activate button 111 and go through the process of selecting a new reference frame. To review the stored reference frame, the user actuates display reference frame button 118. To return to normal viewing after actuating button 118, the user actuates cancel button 118.

FIG. 2 illustrates in greater detail video subsystem 102 and its connection to display 101 and speaker 121. Video subsystem 102 receives television RF signals via conductor 201. Tuner 202, also referred to as tuner 1, is utilized to provide the user the capability to watch television in a normal manner. Tuner 203 is utilized to capture the information that will be utilized by the components of video subsystem 102 that recognize and store frames which match the reference frame. Two tuners are utilized so that the recognition process does not interfere with the use of the video subsystem 102 and display 101 for normal television viewing.

Controller 208 provides overall control for video subsystem 102 and advantageous, may be a standard microcomputer of types that are well known in the art. Controller 208 controls the the selection of video and audio information that is to be presented to display 101 and speaker 200. The video information of tuner 203 is converted to a digital format by chroma digitizer 211; whereas the audio information is digitized by audio digitizer 213. Blocks 211 and 213 are well known in the art. All processing and storage of information related to the recognition of the reference frame is performed in the digital domain. When displaying this information, it is necessary to convert this information to a composite video format that can be utilized by output selector 204. This function is performed by output formatter 206 under control of controller 208. In addition, controller 208 can control output selector 204 so that output selector 204 selects the video picture from tuner 202, tuner 203, or output formatter 206. The latter formatter receives its video input information from reference frame RAM 209 or frame RAM 216 and its audio input information from audio RAM 2 17. Output formatter 206 via output selector 204 allows controller 208 to superimpose a textual message on the video picture. The capability to superimpose a textual message is utilized by controller 208 to provide instructions to the user while the user is performing various operations with control unit 110. This capability of superimposing textual messages on a video picture is well known in the art and is used extensively in commercially available VCRs.

Whereas controller 208 provides the overall control, correlation processor 210 performs the mathematical functions and other operations required to compare the reference frame with frames received from the television channel selected by tuner 203. (These frames from tuner 203 are called the "current frames".) Correlation processor 210 may be any number of commercially available digital signal processors (DSP). Whereas FIG. 2 illustrates that the functions performed by controller 208 and correlation processor 210 are performed in distinct hardware, one skilled in the art could readily see that these functions could be performed by a single DSP.

When the user actuates activate button 111, controller 208 clears RAM 209 and RAM 216. Note, that current frame RAM 212 is updated on the occurrence of each new frame of information from tuner 203 via chroma digitizer 211. Upon actuation of button 111, controller 208 controls output selector 204 to select the composite video information from tuner 203. In addition, controller 208 controls output selector 204 to display the various textual messages that controller 208 utilizes to guide the user through the selection of the reference frame. Once the reference frame has been selected, that frame is stored in reference frame RAM 209 under control of controller 208.

After the storing of the reference frame in reference frame RAM 209, controller 208 transmits signals to correlation processor 210. In response to these signals, correlation processor 210 performs a correlation analysis on the reference frame stored in RAM 209 to obtain the correlation values that are used to compare the reference frame against each current frame received within the specified time interval. When the time of day is within the time interval specified by the user during the selection of the reference frame, correlation processor 210 calculates the correlation parameters for the current frame stored in RAM 212 and compares these correlation values against the correlation values obtaining for the reference frame. If these correlation values exceed a predefined threshold, correlation processor 210 transfers the current frame from RAM 212 to frame RAM 216. (Frame RAM 216 can store a plurality of frames.) In addition, correlation processor 210 signals controller 208 that a frame has been recognized and stored.

Controller 208 is responsive to this signal from correlation processor 210 to display a textual message on display 101 via output formatter 206 and output selector 204 informing the user that a frame has been detected which matched the reference frame.

When the user actuates display frame button 114 on control unit 110, controller 208 displays the latest frame in frame RAM 218 on display 101 via output formatter 206 and output selector 204. The user is then given the opportunity to display other frames in frame RAM 216 through the utilization of buttons 116 and 117 on control unit 110.

One skilled in the art could readily envision how to incorporate the operations of FIG. 2 performed with respect to frame detection, storage, retrieve, and display into an existing VCR or television unit. In addition, those operations could be incorporated into a cable TV tuning unit.

Figure 3:
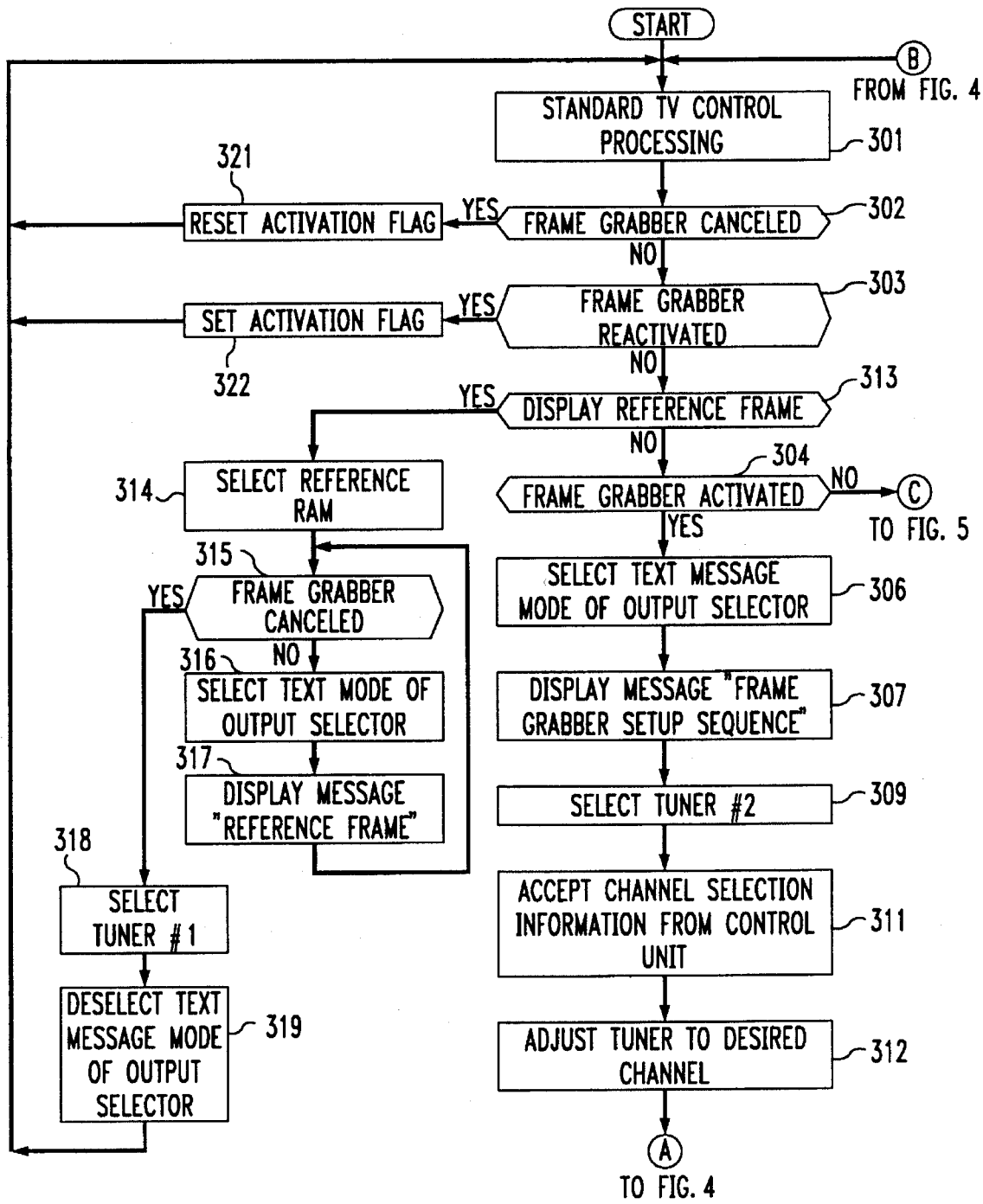
FIGS. 3, 4, and 5 illustrate, in flow chart form, the functions performed by controller 208 of FIG. 2.
Figure 4:
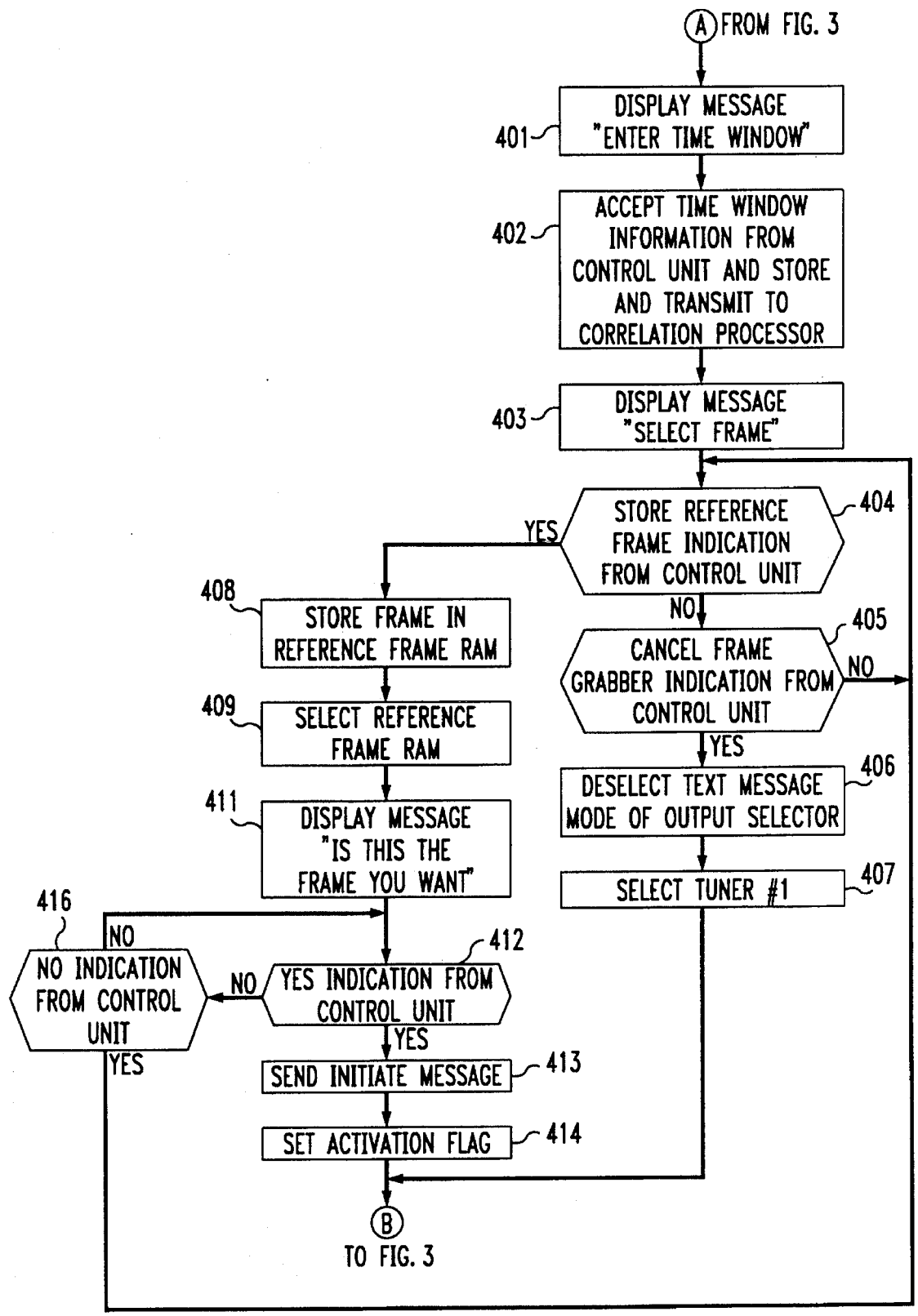
Figure 5:
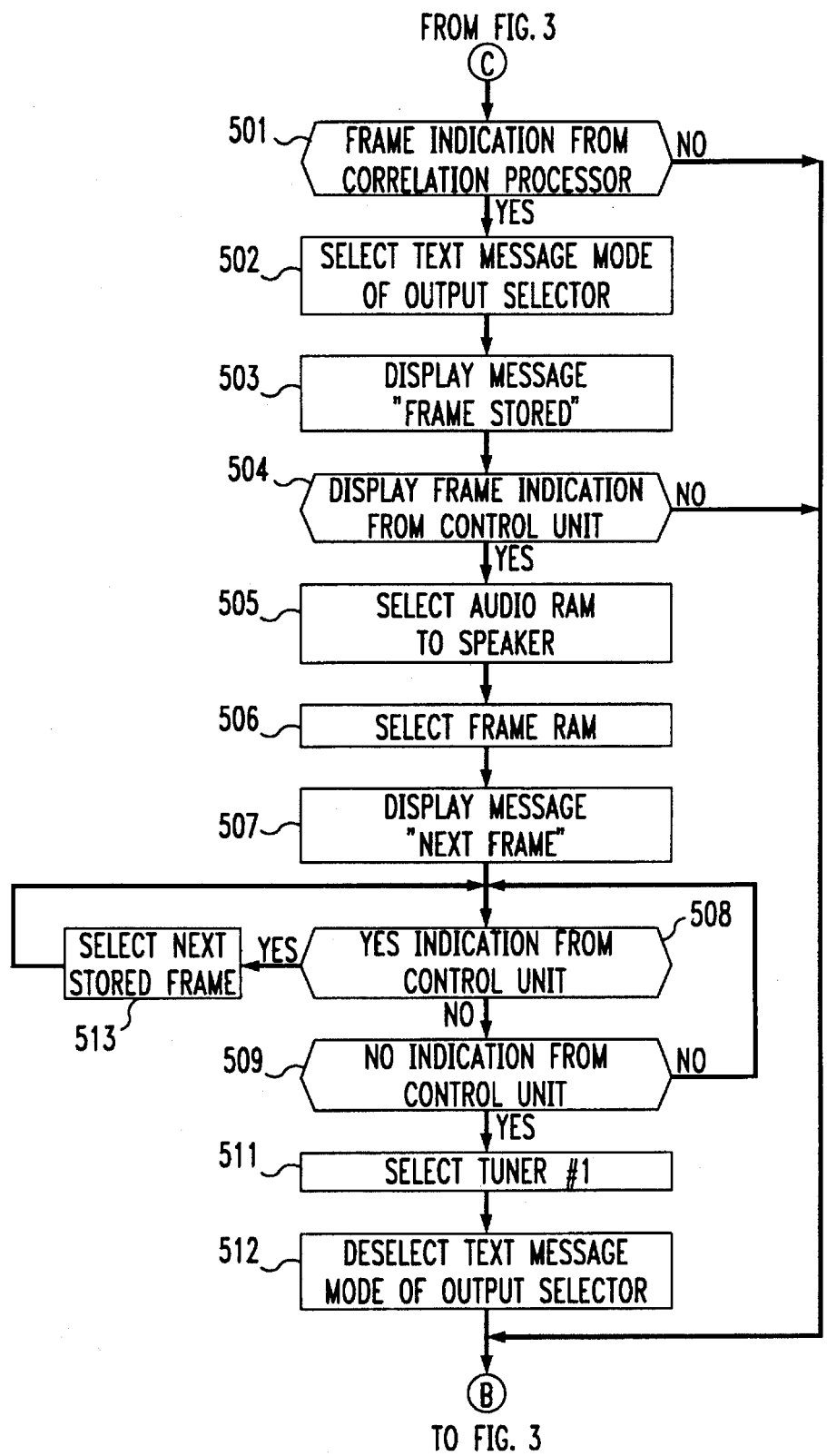

FIGS. 3, 4, and 5 illustrate, in flow chart form, the operations performed by controller 208. Upon being started, controller 208 performs a continuous loop of processing operations. First, controller 208 by executing 301 performs those functions which are standard television control processing that allow the user to control the video picture and audio information outputted by tuner 202 for normal television viewing. After execution of block 301, decision block 302 is executed to determine if the cancel button 112 on control unit 110 has been actuated. If the answer is yes, block 321 is executed resetting the activation flag and control is returned to block 301. During the activation operations, actuation of cancel button 112 only terminates those operations. The activation flag is utilized by correlation processor 210 to determine when correlation processor 210 should perform the operations necessary to compare current frames with a reference frame.

If the result of decision block 302 is no, control is transferred to decision block 303 which determines whether reactivate button 113 on control unit 110 has been activated. If this button has been actuated, control is transferred to block 322 which sets the activation flag. Correlation processor is responsive to the activation flag being set to utilize the reference frame stored in reference frame RAM 209 to begin the process of searching for a current frame that matches the stored reference frame.

Returning to decision block 303, if the answer is no, control is transferred to decision block 313 which determines whether display reference frame button 313 has been actuated. If the answer is yes, control is transferred to block 314 which selects the output of reference frame RAM 209 for display on display 101 via output selector 204 and output formatter 206. After execution of block 314, control is transferred to decision block 3 15 which determines if cancel button 112 has been actuated. If the answer is no, which means that the user wants to exit the display reference frame operation, control is transferred to blocks 318 and 319 which return the user to normal television viewing and transfer control back to block 301. If the answer is yes, blocks 316 and 3 17 are executed which display the contents of reference frame RAM 209 and the message "REFERENCE FRAME", respectively. From block 317, control is transferred back to decision block 3 15.

Returning to decision block 313, if the answer is no, control is transferred to decision block 304 which determines whether activate button 111 has been actuated. If button 111 has been actuated, control is transferred to 306 which places output selector 204 in the text message mode. This allows the superimposing of a textual message generated by controller 208 onto the video picture being displayed on display 101. Block 307 then displays the message "frame grabber setup sequence". Control is then transferred to block 309 which controls output selector 204 to select the output from tuner 203. Block 311 then accepts channel selection information from the user via control unit 110 to set tuner 203 to the channel desired by the user by execution of block 312.

Control is transferred to block 401 of FIG. 4 which displays "the message enter time window". Block 402 accepts the time window information entered by the user on control unit 110 via conventional TV controls 118. After execution of block 402, controller 208 displays the message "select frame" by execution of block 403. Control is then transferred to decision block 404 which checks to see if select reference frame button 115 has been actuated. If button 115 has been actuated, control is transferred to block 408 which stores the current frame in reference frame RAM 209. Controller 208 then displays the contents of reference frame 209 on display 101 by controlling output formatter 206 and output selector 204. While the reference frame is being displayed on display 101, the controller via formatter 206 and output selector 204 displays the message "Is this the frame you wanted?" by execution of block 411. By execution of decision blocks 412 and 416, controller 208 interrogates the user to ascertain whether or not the user actually wanted to select the frame presently stored in reference frame RAM 209. If the user affirms this selection, block 413 is executed which sends an initiate message to correlation processor 210 and sets the activation flag by execution of block 414. Correlation processor 210 is responsive to the initiate message to do the correlation analysis of the reference frame and is responsive to the setting of the activation flag to compare current frames received from tuner 203 via chroma digitizer 213 with the reference frame. If the customer did not intend to select the frame presently stored in reference frame RAM 209, control is transferred back to decision block 404.

Returning to decision block 404, if the answer is no, control is transferred to decision block 405 which determines if cancel button 112 has been actuated. This decision block allows the user to terminate the setting up of the reference frame in reference frame RAM 209. If the answer to decision block 405 is no, control is transferred back to decision block 404. However, if the answer to decision block 405 is yes, control is transferred to block 406. Block 406 de-selects output selector 204 from the text message mode so that output selector 204 is no longer superimposing a textual message onto display 101. Next, tuner 202 is selected by controlling outputs selector 204 so that the user is returned to normal television viewing. After execution of block 407, control is transferred back to block 301 of FIG. 3.

Returning to decision block 304 of FIG. 3, if the result is no, then control is transferred to block 501 of FIG. 5. Decision block 501 interrogates to see if correlation processor 210 is transmitting the frame indication. The latter indication specifies that correlation processor 210 has found at least one frame that matches the stored reference frame. If the answer is no in decision block 501, control is transferred back to block 301 of FIG. 3. If the answer is yes, control is transferred to blocks 502 and 503 which display the message "FRAME STORED" on display 101 by properly conditioning output selector 204.

After execution of block 503, control is transferred to decision block 504. The latter decision block determines whether display frame button 114 has been actuated on control unit 110. If the answer is no, control is transferred back to block 301 of FIG. 3. If the answer is yes, the output of audio RAM 217 and the output of frame RAM 216 are communicated to speaker 121 and display 101, respectively, via formatter 206 and output selector 204 under control of controller 208 by execution of blocks 505 and 506. In addition, controller 208 displays the message on display 101 "NEXT FRAME" by properly controlling output formatter 206 and output selector 204 through execution of block 507".

Decision blocks 508 and. 509 give the user the opportunity to select subsequent frames stored in frame RAM 216 by utilizing buttons 116 and 117. If YES button 116 is actuated, block 513 causes the next frame to be displayed on display 101. If the YES button is not actuated but the NO button 117 is actuated, blocks 511 and 512 are executed to return the user to normal television viewing. If the result of decision block 509 is no, control is transferred back to decision block 508. After execution of block 512, control is transferred back to block 301 of FIG. 3.

Figure 6:
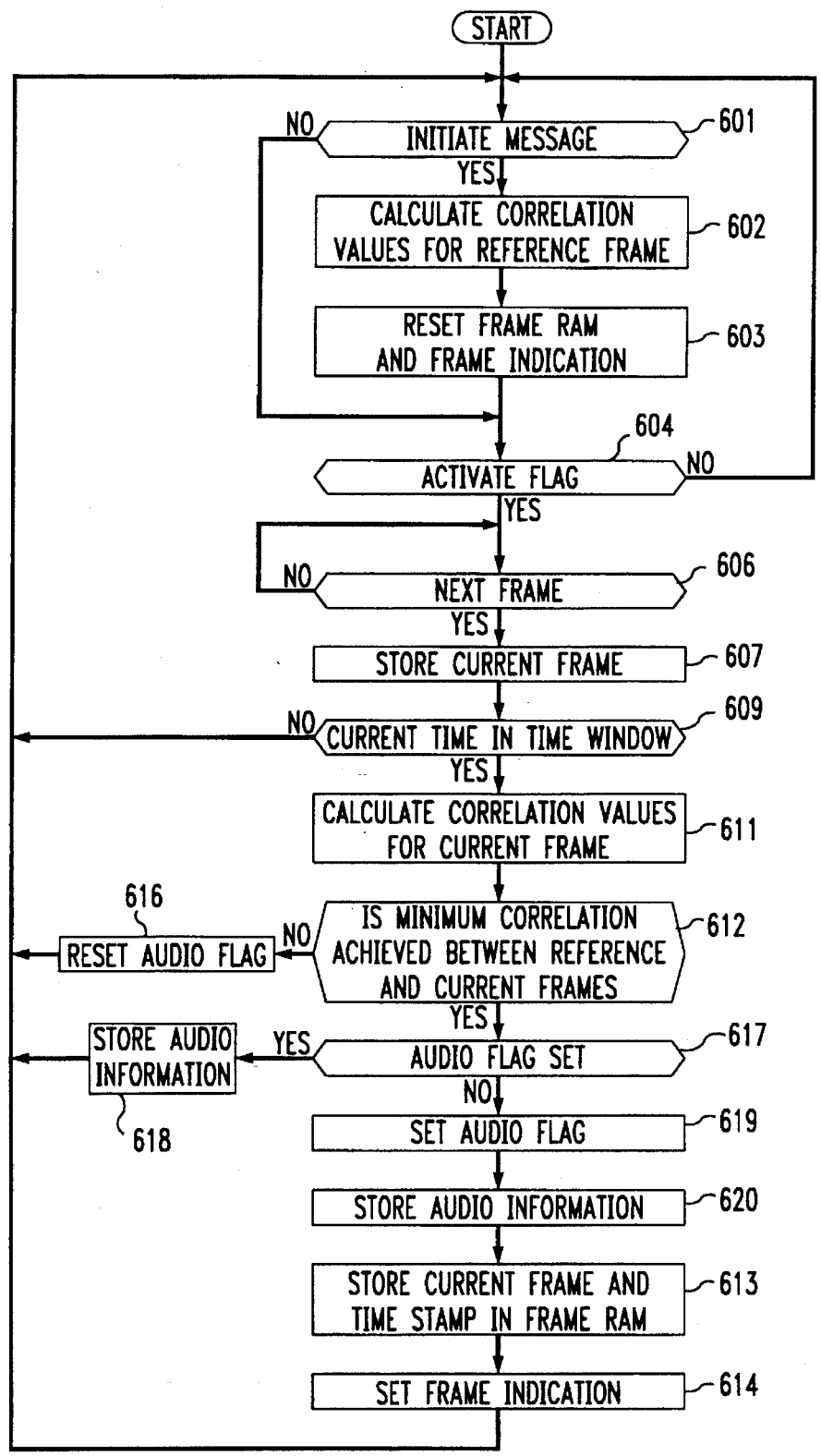
FIG. 6 illustrates, in flow chart form, the operations performed by correlation processor 210 of FIG. 2.

FIG. 6 illustrates in flow chart form, the operations performed by correlation processor 210. As can be observed from FIG. 6, once correlation processor 210 starts, it remains in an endless loop. Decision block 601 checks to see if there is an initiate message from controller 208. The initiate message indicates that the user has finished the process of selecting a new reference frame by actuation of YES button 116 during the activation process. If the answer to decision block 601 is yes, correlation processor 210 calculates the correlation values for the frame presently stored in reference frame RAM 209 and stores these calculated correlation values internal to correlation processor 210. Next, block 603 is executed to reset the contents of frame RAM 216 and to reset the frame indication which is transmitted to controller 208.

Whether the result of decision block 601 is yes or no, decision block 604 is eventually executed. If the result of decision block 604 is no, control is transferred back to decision block 601. However, if the result is yes, decision block 606 is executed. The latter decision block checks to see if a full video frame has been received from tuner 203 and stored in current frame RAM 212 via chroma digitizer 211. If the answer is yes, block 607 confirms this fact and transfer control to decision block 609. Decision block 609 utilizing the output of clock 207 determines whether the current time is within the time window specified by the user. If the answer is yes, control is transferred to block 611 which calculates the correlation values for the current frame and transfers control to decision block 612.

Decision block 612 determines whether minimum correlation has been achieved between the reference and current frames. If the answer is yes, control is transferred to decision block 617 to check if the audio flag is already set. The audio flag is used to assure that only one current frame is saved for each segment of television programming that has frames that match the reference frame. This done to decrease the size of frame RAM 216 but still allow the audio portion of the segment to be store in audio RAM 217. If the audio flag is set, decision block 617 transfers control to block 618. The latter block stores the audio information for the frame in audio RAM 217 and transfers control to decision block 610.

If the answer to decision block 617 is no, control is transferred to block 619 which sets the audio flag and transfers control to block 620. Block 620 stores the audio information and transfers control to block 613. The latter block transfers the contents of current frame RAM 212 to frame RAM 216. Finally, block 614 sets the frame indication which indicates to controller 208 that a frame has been found which matches the reference frame. Finally, control is transferred back to decision block 601.

Returning to decision block 612, if the answer is no, control is transferred to block 616 which resets the audio flag and transfers control back to block 601. The audio flag is reset on the assumption that audio information associated with frames matching the reference frame has ended.

Figure 7:
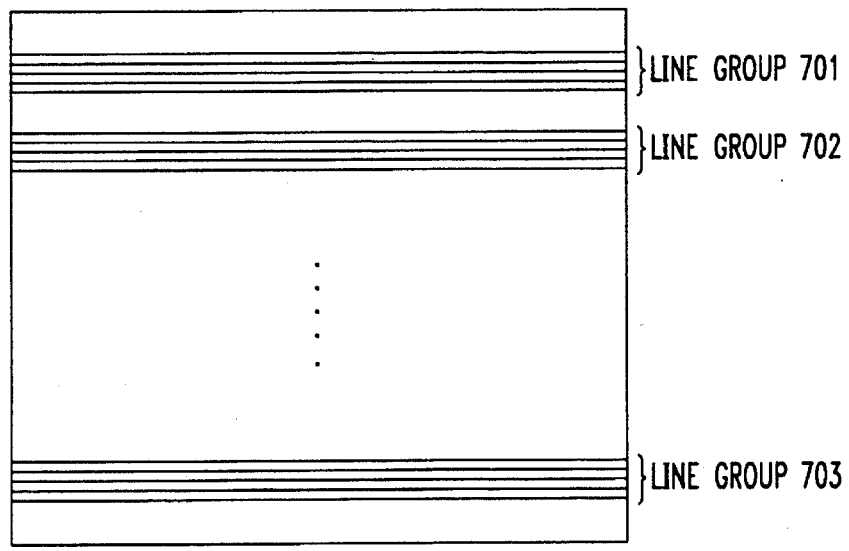
FIG. 7 illustrates the grouping of television lines for performing the correlation operations of correlation processor 210 of FIG. 2.
Figure 8:
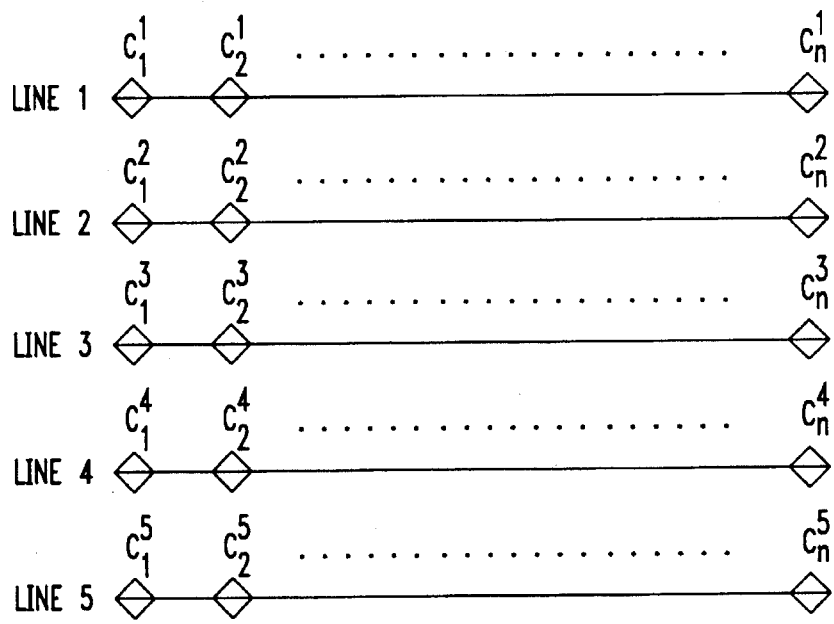
FIG. 8 illustrates the method used for selecting a line from the groups of lines of FIG. 6.

Many techniques are known for determining whether a video frame is similar to a reference video frame. The calculations performed in blocks 602, 611, and 612 may be performed by a number of methods well known to those skilled in the art. A new, simpler technique, hence a faster technique, is now detailed. As illustrated in FIG. 7, a predetermined number of line groups 701–703 are arbitrarily selected from the reference frame. Advantageously, each group of lines has 5 lines, and the predetermined number of line groups is 10. The technique first selects one line out of each group. The selected line is the one of the line group that shows the minimum difference in color content to the line above and the line below the selected line. Line group 701 is illustrated in FIG. 8. In FIG. 8, only lines 2 and 4 are legible for selection. Each point "C" on a line is composed of three color values: red, r, green, g, and blue, b. For example, the point on line 2, $C_1^2$ (where the superscript "2" defines the line number within the line group, and the subscript "1" defines the point on the line) includes $r_1^2$, $g_1^2$ and $b_1^2$. For lines 2 and 4, the following calculations are performed: For line 2 and color red, r $$W_r^2 = \sum_{i=1}^{n} abs(r_i^2 - r_i^1) + \sum_{i=1}^{n} abs(r_i^2 - r_i^3)$$

where "n" is the number of points on a line and abs() is the mathematical absolute function. $W_g^2$ and $W_b^2$ are similarly calculated. For line 4 and color red, r $$W_r^4 = \sum_{i=1}^{n} abs(r_i^4 - r_i^3) + \sum_{i=1}^{n} abs(r_i^4 - r_i^5)$$

Again $W_g^4$ and $W_b^4$ are similarly calculated. These calculations are used to pick line 2 or line 4 as follows:

$$V = W_r^2 + W_g^2 + W_b^2$$

$$Z = W_r^4 + W_g^4 + W_b^4$$

then if

V>Z chose line 4

V>Z chose line 2

The above calculations are used to select a line in each of line groups 702–703.

The selected line in each group of the reference frame is compared against the same line in same group of the current frame using the following calculations: For each group, the following operations are performed for each selected line $$D_j = \sum_{i=1}^{n} abs(R_{jri} - F_{jri}) + \sum_{i=1}^{n} abs(R_{jgi} - F_{jgi}) + \sum_{i=1}^{n} abs(R_{jgi} - F_{jgi})$$

where j is the line group number, i is the point number, r, g, b are color designations, R is a point from the reference frame, and F is a point from the current frame.

Minimum correlation is achieved when $$\sum_{j=1}^{10} D_j \leq K$$

where K is a predefined number.

It is to be understood that the above-described embodiments are merely illustrative of principles of the invention and that other arrangements may be devised by those skilled in the art without departing from the spirit or scope of the invention.

We claim:

1. An apparatus for obtaining and displaying individual video frames from video programming material, comprising: means for designating a reference frame of the type of video frame to be obtained from the video programming material;

means for detecting and storing video frames that are substantially similar to the reference frame;

the means for detecting and storing comprises means for only storing one video frame of a program segment of the video programming material in which the reference frame is continuously detected;

means for displaying the stored video frames;

the means for designating comprises means for interacting with a user of the apparatus to detect the user designating the reference frame as a video frame from other video programming material which is displayed to the user is to be the reference frame where the other video programming material is similar to the video programming material; and means for interacting with a user of the apparatus so that the user designates when the stored video frames are to be displayed.

2. The apparatus of claim 1 wherein the means for detecting and storing comprises means for storing audio information of the program segment of the video programming material in which the reference frame is continuously detected.

3. The apparatus of claim 1 wherein the means for detecting and storing comprises means for storing time of day information with the video frame.

4. The apparatus of claim 2 wherein the means for displaying further comprises means for reproduce the audio information for each stored video frame when that stored video frame is displayed.

5. The apparatus of claim 3 wherein the means for displaying further comprises means for displaying the stored time of day information for each stored video frame when that stored video frame is displayed.

6. An apparatus for storing and reproducing individual video frames from video programming material, comprising:

means for displaying the video programming material;

means for indicating that a frame occurring in the video programming material is a reference frame as the video programming material is being displayed;

means for storing the reference frame and for determining a first set of recognition parameters from the reference frame;

means for determining a second set of recognition parameters for each current frame as it occurs in the video programming material and for correlating the first and second sets of recognition parameters to specify that a current frame is to be stored upon a predefined correlation value being achieved;

means for storing the specified current frame;

means for requesting the display of the specified current frame;

means for displaying the specified current frame in response to the display of the specified current frame being requested by the means for requesting;

means for storing comprises means for storing time of day information with the stored specified current frame; and means for displaying comprises means for displaying the stored time of day information for the stored specified current frame when that stored specified current frame is displayed.

7. The apparatus of claim 6 wherein the means for determining and correlating comprises means for determining a program segment during which the predefined correlation value is achieved; and the means for storing the specified current frame comprises means for storing audio information occurring during the determined program segment.

8. The apparatus of claim 7 wherein the means for displaying the specified current frame comprises means for reproducing the stored audio information for the program segment in which the specified current frame occurred.

9. The apparatus of claim 6 wherein the means for indicating comprises means for specifying a time interval during which the means for determining and correlating is to function.

10. The apparatus of claim 9 wherein the means for requesting comprises means for requesting the display of the stored reference frame; and the means for displaying further comprises means for displaying the stored reference frame in response to the display of the stored reference frame being requested by the means for requesting.

11. The apparatus of claim 10 wherein the means for requesting comprises means for requesting the stopping of the function of the means for determining and correlating; and the means for determining and correlating comprises means for stopping in response to stopping being requested by the means for requesting.

12. The apparatus of claim 11 wherein the means for requesting further comprises means for requesting the restart of the function of the means for determining and correlating; and the means for determining and correlating further comprises means for restarting in response to the restart being requested by the means for requesting.

13. The apparatus of claim 10 wherein the means for storing the specified current frame has a capacity for storing a plurality of specified current frames and means for requesting further comprises means for displaying the stored plurality of specified current frames; and means for displaying further displaying the requested stored plurality of specified current frames in response to the displaying of the stored plurality of specified current frames being requested by the means for requesting.

14. A method for storing and reproducing individual video frames from video programming material, the method comprising the steps of:

displaying the video programming material;

indicating that a frame occurring in the video programming material is a reference frame as the video programming material is being displayed;

storing the reference frame and determining a first set of recognition parameters from the reference frame;

determining a second set of recognition parameters for each current frame as it occurs in the video programming material and correlating the first and second sets of recognition parameters to specify that a current frame is to be stored upon a predefined correlation value being achieved;

storing the specified current frame;

requesting the display of the specified current frame;

displaying the specified current frame in response to the display of the specified current frame being requested by the step of requesting;

the step of storing comprises the step of storing time of day information with the stored current specified frame; and the step of displaying comprises the step of displaying the stored time of day information for the stored current specified frame when that stored specified current frame is displayed.

15. The method of claim 14 wherein the step of determining and correlating comprises the step of determining a program segment during which the predefined correlation value is achieved; and the step of storing the specified current frame comprises the step of storing audio information occurring during the determined program segment.

16. The method of claim 15 wherein the step of displaying the specified current frame comprises the step of reproducing the stored audio information for the program segment in which the specified current frame occurred..

17. The method of claim 14 wherein the step of indicating comprises the step of specifying a time interval during which the step of determining and correlating is to function.

18. The method of claim 17 wherein the step of requesting comprises the step of requesting the display of the stored reference frame; and the step of displaying further comprises the step of displaying the stored reference frame in response to the display of the stored reference frame being requested by the step of requesting.

19. The method of claim 18 wherein the step of requesting comprises the step of requesting the stopping of the function of the step of determining and correlating; and the step of determining and correlating comprises the step of stopping in response to stopping being requested by the step of requesting.

20. The method of claim 19 wherein the step of requesting further comprises the step of requesting the restart of the function of the step of determining and correlating; and the step of determining and correlating further comprises the step of restarting in response to the restart being requested by the step of requesting.

21. The method of claim 18 wherein the step of storing the specified current frame has a capacity for storing a plurality of specified current frames and step of requesting further comprises the step of requesting the displaying of the stored plurality of specified current frames; and step of displaying further displaying the requested stored plurality of specified current frames in response to the displaying of the stored plurality of specified current frames being requested by the step of requesting.

* * * * *